(12) United States Patent  
Svensson et al.

(10) Patent No.: US 7,468,594 B2
(45) Date of Patent: Dec. 23, 2008

(54) PROTECTION DEVICE

(75) Inventors: Goran Svensson, Danderyd (SE); Matts Linger, Onsala (SE)

(73) Assignee: Jokab Safety AB, Kungsbacka (SE)

( * ) Notice: Subject to any disclaimer, the term of this patent is extended or adjusted under 35 U.S.C. 154(b) by 63 days.

(21) Appl. No.: 11/690,236

(22) Filed: Mar. 23, 2007

(65) Prior Publication Data

US 2007/0211395 A1  Sep. 13, 2007

Related U.S. Application Data

(63) Continuation of application No. PCT/SE2005/001420, filed on Sep. 26, 2005.

(30) Foreign Application Priority Data

Sep. 24, 2004  (SE) ................................. 0402329

(51) Int. Cl.
  *G05B 19/29*  (2006.01)
(52) U.S. Cl. .................... 318/602; 318/560; 318/565
(58) Field of Classification Search ............... 318/560, 318/563, 565, 568.12, 568.16, 602, 587
  See application file for complete search history.

(56) References Cited

U.S. PATENT DOCUMENTS

| 4,530,056 | A | * | 7/1985 | MacKinnon et al. ........... 701/25 |
| 4,594,714 | A |   | 6/1986 | Fischer et al. |
| 4,642,781 | A |   | 2/1987 | Szonyi |
| 5,130,632 | A |   | 7/1992 | Ezawa et al. |
| 5,479,079 | A |   | 12/1995 | Jeong et al. |
| 6,081,187 | A | * | 6/2000 | Akutsu ........................ 340/436 |
| 6,356,130 | B1 | * | 3/2002 | Lee ............................. 327/198 |
| 6,490,509 | B1 | * | 12/2002 | Sato et al. ....................... 701/1 |
| 2003/0050735 | A1 |   | 3/2003 | Griffis |

FOREIGN PATENT DOCUMENTS

| EP | 0072866 | 3/1983 |
| EP | 0474881 | 3/1992 |
| EP | 0927612 | 7/1999 |
| EP | 1419858 | 5/2004 |
| GB | 2229296 | 9/1990 |
| WO | WO 9109354 | 6/1991 |
| WO | WO 0171916 | 9/2001 |

* cited by examiner

*Primary Examiner*—Rina I Duda
(74) *Attorney, Agent, or Firm*—Gauthier & Connors LLP

(57) ABSTRACT

The present invention relates to a safety system for use in protection functions, which system prevents that an error in one control circuit do not result in a function failure by using supervising functions comprising at least two sensors connected to a monitoring unit which receives and processes information about a position of a machine from both sensors and compares the results with stored values and a number of input conditions for the monitoring unit, whereby said sensors comprise means for generating data with respect to a position of a machine movement and said monitoring unit comprises means, which with respect to the result of the comparison is arranged to stop a machine movement if conditions for a stop are fulfilled. The monitoring unit is arranged to compare values from said sensors and when detecting deviating value from either one of sensors detecting a functional error with the sensors.

8 Claims, 2 Drawing Sheets

PROTECTION DEVICE

PRIORITY INFORMATION

The present application is a continuation of PCT Application No. PCT/SE2005/001420, filed on Sep. 26, 2005 which claims priority to Swedish Application No. SE0402329-7, filed on Sep. 24, 2004. Both applications are incorporated herein by reference in their entireties.

TECHNICAL FIELD

The present invention relates to an arrangement for area restriction and monitoring position and speed.

BACKGROUND OF THE INVENTION

I many machines, it is important, form the safety point of view, that in a reliable way to know where a moving machine part is and also how fast it moves. For an industrial robot, for example, it is used to divide operation area into safe sectors. This means that if a person walks into the protected sector, then the robot is stopped only if it is in the same sector by using a safety device which detects if the person enters the sector. The sector in which the robot operates is usually detected by double switches which are affected by ridges whose length correspond to a protected sector. If a robot, for example, turns so that it is heading into the sector in which the person is present, which is indicated by means of the safety device in the sector in question is affected. To set the size of the safety sector mechanical ridges are used. These ridges must be designed so that the robot can stop before coming into the safety sector. How long it takes for the robot to stop depends on the stopping distance at the worst case, i.e. the fastest speed of the robot. The longer the stopping distance a robot has the longer from the safety sector the robot must receive the stop signal.

All machine parts having turning or straightforward movements may need sector supervision from the safety point of view. Sector supervision may for example be used for sector safety.

The speed a machine part moves is also an important issue for the safety design.

If a machine moves with low speed there is a batter chance for a person to stand clear. Some times low speed in combination with a stop possibility using a switch bottom is a method that is used as safety measure, which is used for example at maintenance or fault-localization. An automatic speed monitoring may control that the moving machine part is stopped directly if the speed is exceeded. When designing the safety sectors one may monitor that the speed with which the machine goes from a safety sector to another must be low. This means that the addition of supplementary long stop distance at high speed can be eliminated, i.e., the machine is stopped in that time if the speed at such a position is too high. A condition to surely know where the machine is, demands that the area supervision fulfils the requirements which are expected, to be able to rely on the information.

EP 072866 relates to a robot control system for positioning the movable unit of a robot. The system comprises a hydraulic unit using direction solenoid valves. The system comprises a detecting means and a control unit for calculating the difference between the instructed position and the present position. The control unit controls the acceleration of the hydraulic fluid and measures it. When the difference between a second preset value becomes equal to a first preset value, a brake is operated to stop the unit. The system does not use two position detectors which provide the position of the moving part.

EP 0927612 relates to a robot controller, in which when a point representative of position of a robot makes an abnormal motion in space, such abnormality is sensed and the robot brought to a stop. A detector continuously gives the position of the robot which is compared to an abnormities position index. When an abnormal motion is detected, the robot is immediately stopped.

SUMMARY OF THE INVENTION

To simplify the aforementioned position and speed monitoring, a new arrangement is developed which considerably simplifies and provides additional safety possibilities.

Thus, the invention relates to a safety system for safety functions, in which an error in one control circuit does not result in a function failure. The system comprises supervising functions comprising at least two sensors connected to a monitoring unit, which receives and processes information about a position of a machine from both sensors and compares the results with stored values and a number of input conditions for the monitoring unit. The sensors comprise means for generating data with respect to a position of a machine movement and said monitoring unit comprises means, which with respect to the result of the comparison is arranged to stop a machine movement if conditions for a stop are fulfilled. The monitoring unit is arranged to compare values from said sensors and when detecting deviating value from either one of sensors, to detect a functional error with the sensors.

Preferably, the unit is programmable. The sensor further provides information about speed, which is used for stopping the machine if speed conditions are fulfilled. The sensor may also provide information about a direction of said machine movement, which is used for stopping the machine if position conditions are fulfilled. The system is used for area limitation of an industrial robot. Two or more sensors are inter-connected with one or several programmable programming units through a bus wire.

According to one preferred application, the system is used for area limitation of an industrial robot.

The invention also relates to a robot monitoring system comprising a safety system for safety functions. The security system prevents that an error in a which system prevents that an error in one control circuit does not result in a function failure by using supervising functions comprising at least two sensors connected to a monitoring unit, which receives and processes information about a position of a machine from both sensors and compares the results with stored values and a number of input conditions for the monitoring unit. The sensors comprise means for generating data with respect to a position of a robot part's movement and said monitoring unit comprises means, which with respect to the result of the comparison is arranged to stop a parts movement if conditions for a stop are fulfilled. The monitoring unit is arranged to compare values from said sensors and when detecting deviating value from either one of sensors detecting a functional error with the sensors. Preferably, the sensors are absolute encoders. The system comprises means for storing instructions relating one or several of: one or several protection sensors, speed limit, area limitation, area limitation for both rectilinear and rotating movements, and combinations of speed limit and area limitation.

The invention also relates to a method for safe control of a machine by means of a safety system, in which an error in a control circuit does not result in a safety function failure. The method comprises the steps of: arranging at least two sensors connected to a monitoring unit, providing said monitoring unit with information about a machines position from both sensors, comparing these results with stored values and a number of input conditions for monitoring unit, generating data by means of said sensor relating to a position of a machine movement, with respect to the result of said comparison stopping a machine movement by means of the monitoring unit if conditions for stop are fulfilled, and that the monitoring unit is arranged to compare values from said sensors and when detecting deviating value from either one of sensors, to detect a functional error with the sensors.

BRIEF DESCRIPTION OF THE DRAWINGS

In the following the invention will be described in more detail in a non-limiting way with reference to attached drawings, in which.

DETAILED DESCRIPTION OF PREFERRED EMBODIMENTS

In the following the invention will be described in a non-limiting way with reference to monitoring of movements of an industrial robot. However, it is understood that the invention is not limited to the illustrated embodiments. The application areas extend to all applications in which moving devices, such as cranes, overhead cranes, conveyers, etc. occur.

Figure 1:
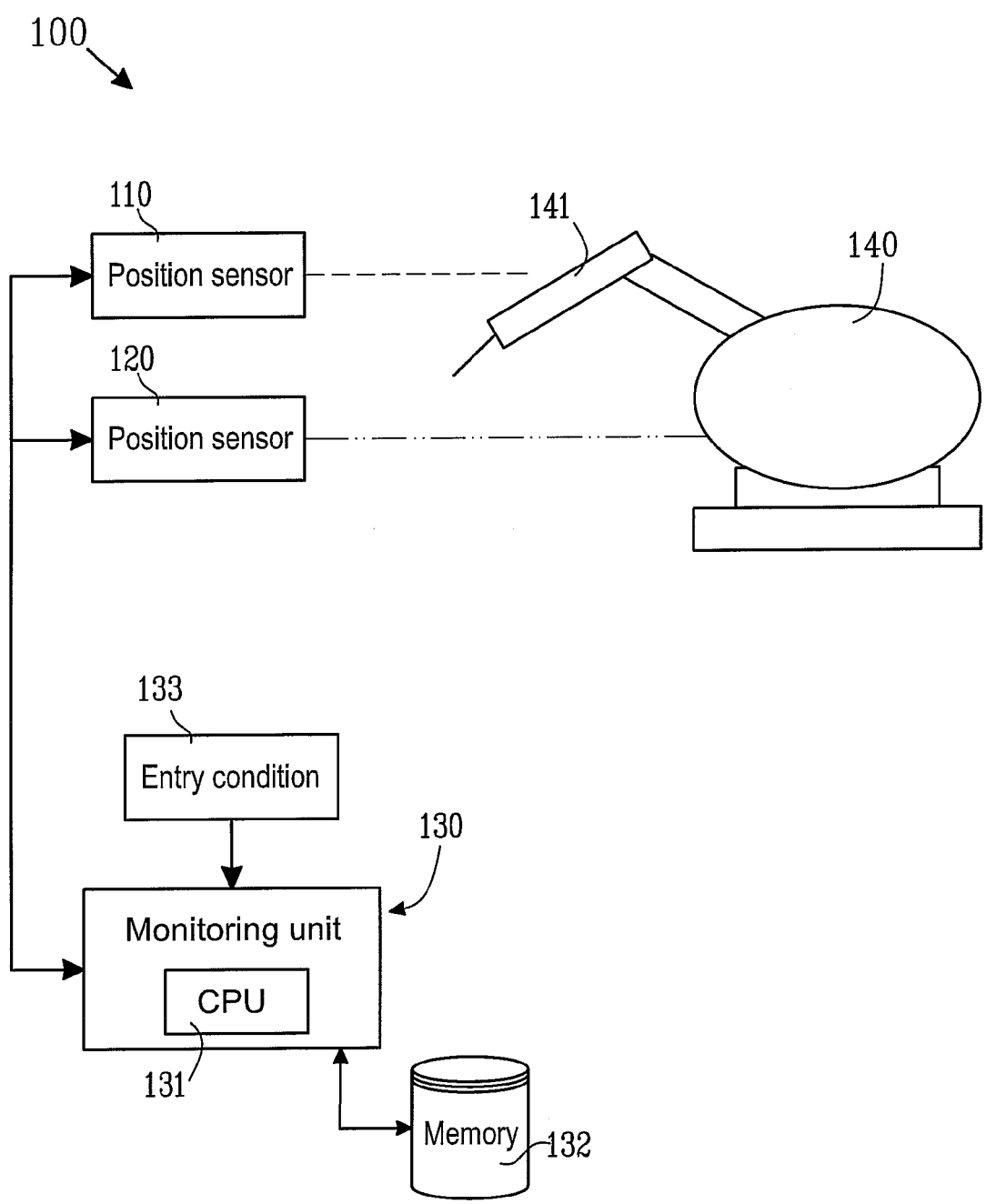
FIG. 1 shows a very schematic embodiment of a monitoring system according to the present invention.

According to FIG. 1, the system 100 comprises at least two sensors 110 and 120 which provide position information to a safety monitoring unit 130. The fundamental condition is same as the today's system, i.e. double information about which position a machine part 141 of a machine, in this case a robot 140 is situated in, as well as assuming that no errors will occur in both sensors simultaneously.

In a mechanical design, the position of fixed notches which are designed so that two switches sense each section is guaranteed.

According to the invention, the detection comprises two sensors 110 and 120, which provides the monitoring unit 130 with current position. The monitoring unit 130 uses duplicated control, by means of position signals, to monitor the machine part's 141 position. If the sensors are for example two absolute encoders, which in each position provide the monitoring unit with a position value so that it can both control the position of a defined machine part and also in which direction and speed it moves. Such absolute encoders are available on the market, for example PROFIBUS DP 674/675/684/685 from LEINE&LINDE. However, also other position and speed sensors, depending on the application can be used, such as a camera (CCD) based motion analyses system, GPS, laser based sensor, etc.

The monitoring unit comprises a computer unit 131 adapted to receive and process information about a machine's position from the both sensors and compare these results with programmed values in a memory unit 132 and other entry conditions 133 for the monitoring unit. Thus, the sensors provide information about the position of the machine movement and the result is used to stop a machine movement if the programmed conditions for stop are fulfilled. The conditions can be that the speed is not allowed to exceed a certain value, e.g. 250 mm/s if some one enters for testing a program for a robot, that the robot is only allowed to move inside a sector from 70 to 140 degrees, that it is only allowed to move inside a volume which is defined by the boundary, that the speed must be a constantly defined speed, that it is allowed to move slowly when it is close to the boundary of a sector if some one is in that sector, that the speed limit is only valid when some one works in an adjacent sector, so on.

By comparing values from both sensors, the monitoring unit may control that both sensors transmit information. If, for example, one of the sensors should generate an incorrect value or no value at all, this is detected immediately because the difference between the values for different sensors becomes incorrect. If the monitoring unit is of programmable type, the design of the safety is simplified considerably. A machine, such as a robot, may then be delivered with pre-mounted absolute encoders. In the site, that the machine is going to operate may, for example, through programming be provided:

One or several safety sectors; by giving the values when programming the safety system, e.g. in the programming language which is written in terms of values in the program, e.g. degrees.

Speed limit: when the machine goes from one safety sector to another.

Prohibited areas: i.e. the areas that the machine part is not allowed to move into. For an industrial robot which usually has larger operation area than the one used, the admissible movement area is limited to the one that the robot is programmed for.

Area limitation: for example through combination of different axis in an industrial robot. This implies duplicated sensors on each axis.

Area limitation for both rectilinear and rotational movements.

Combinations of speed limit and area limitation.

There is also a possibility of simplifying connection of the absolute encoders to the programmable monitoring unit by connecting them directly to a buss where several sensors can be monitored by one or several monitoring units, preferably programmable monitoring units. In this case, every sensor has a unique address which is provided each sensor or the plug, informing from which sensor the information, is received.

Figure 2:
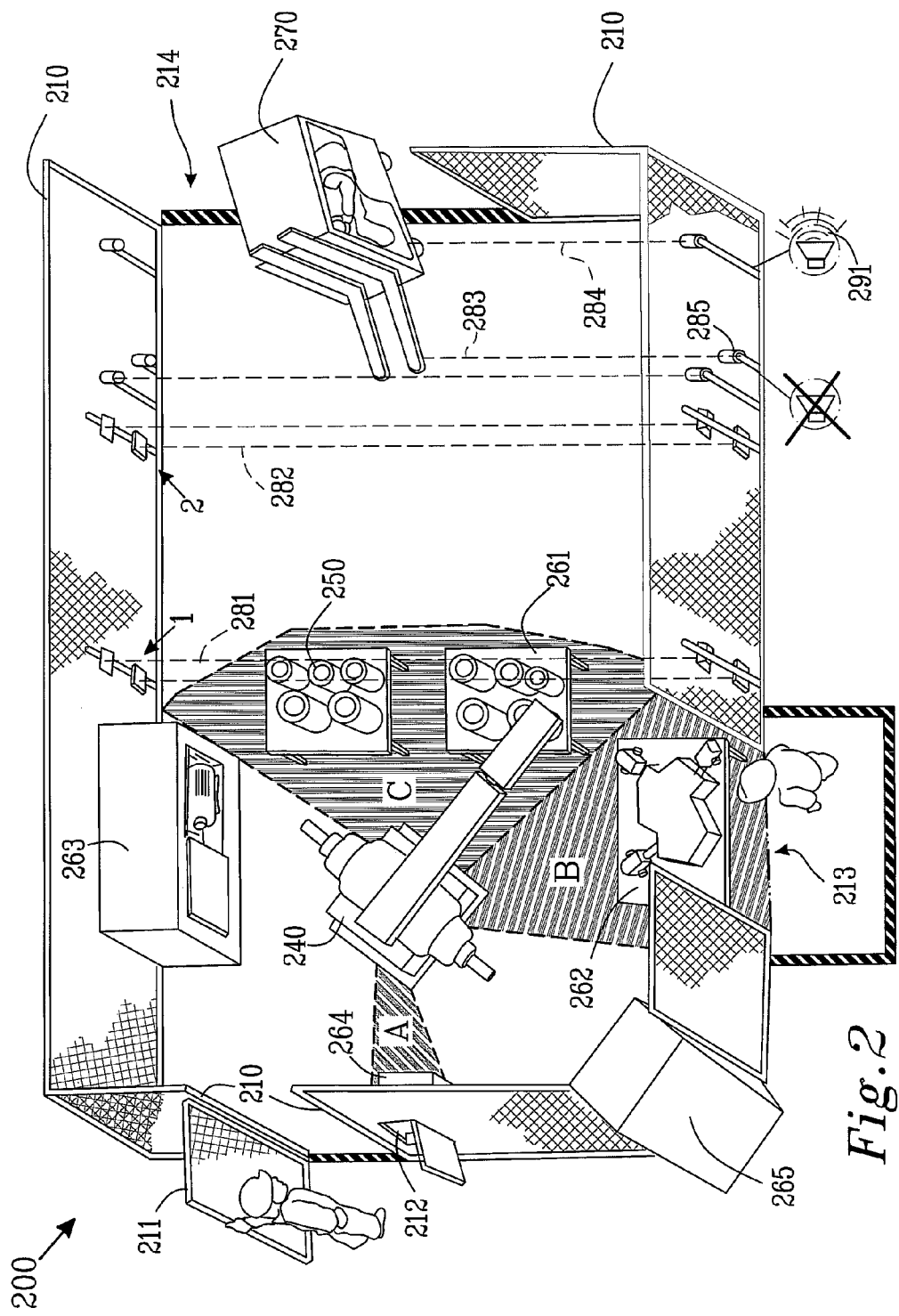
FIG. 2 is a perspective view of a robot installation employing a system according to the present invention.

FIG. 2 illustrates a schematic robot installation 200 in an area provided with gates. The working space is limited by safety gates 210. Through openings in the gates it is possible to enter different sections within the area, e.g. a blocked gate 211, a measurement hatch 212, a port 213 and a truck gate 214. The installation is formed according to the following:

A robot 230 handles objects 250 between a pallet 261, a lathe 262, a multi functional machine 263, a test station 264 and a scrape vessel 265. The work area of the robot 1 divided in sections, which allows for example inspection, if the robot is in a certain area, for example C or D.

At the test station, the objects to be test measured are ordered. In this case manually through the hatch 212. The hatch is provided with a position switch, which gives a stop signal to the robot if it is in sector A. The position of the robot and the motion speed is detected by the aforementioned sensor.

When the blocked gate 211 is opened, the robot is stopped at the position it is. At the measurement station, the object is picked out through the hatch 212, which is provided with a position switch giving the stop signal to the robot if it is in position A. The position of the robot is detected by a sensor, for example mounted in the large rotation axis.

At the position that the truck 270 drives in for pallet handling are arranged light beams 281-284. When the inner light beam (1) is actuated, the robot is stopped wherever it is, if the outer beam is actuated.

When the outer light beam (2) is affected, the robot is stopped if it is in section C. Otherwise the robot receives information that someone is in section C, and area limitation is given. If the light beam is affected, it must be reset outside the beam.

Outside the light beam 2, there are three photocells. The external one is connected to a light signal 291, which warns for entry. The inner photocell is arranged for providing operation stop to the robot before receiving stop signal from the light beam 2. The operation stop is for a gentler braking.

A third photocell 265 is provided for detecting the forks of the truck and may shut down the acoustic signal. On a control cabinet 295 containing the monitoring unit according to the invention, the stops and the reasons for the stops are indicated.

All connections of the safety arrangement are performed with duplicated functions and supervised against short-circuiting.

The system has twin channels for all stop loops of the safety devices, i.e. from the safety arrangement to the robot. Such a system is described in the Swedish patent No. 0000971-2 (PCT/SE01/00588) by the same inventor and incorporated in here through reference. This patent describes a programmable safety system used for safety functions, in which an error in a control circuit does not result in a failure of the safety function. The system comprises monitoring functions including at least two control units, inputs separately connected to both control units. Each control unit executes its own instruction set and continuously compares the result from the execution with each other. At least one control unit may be made accessible another control unit's in and/or out status and/or a number of flags and the control units are arranged to monitor the result of its own executing instruction set and control that the result of the executions are mainly equal.

Moreover, the error detection may be performed in accordance with the Swedish patent No. 0101450-5 (WO 02/086838) by the same applicant and incorporated in here through reference, which describes a safety arrangement comprising a safety module, a data bus and one or several sensors. The security module transmits a pulse train (a dynamic signal) over said bus which constitutes the loop, whereby the pulse train is received by each of the sensors in which the pulse is modified.

All security is connected to the operation stop of the robot, which is same as a duplicated monitored stop input, which is by-passed by means of the programming unit's interlocking switch. When programming, all protection of the interlocking switch on the programming unit is by-passed. At every resetting place for the protection there is a switch box with switches for resetting, start, and stop of the production as well as emergency stop.

The invention is not limited to the illustrated and embodiments, but may vary in different ways without departure from the scope of the attached claims, an the device and the method can be implemented in different way depending on the application, functional units, needs, demands and so on.

The invention claimed is:

1. A safety system for use in protection functions, which system prevents that an error in one control circuit does not result in a function failure by using supervising functions comprising at least two sensors connected to a monitoring unit, which receives and processes information about a position of a machine from both sensors and compares the results with stored values and a number of input conditions for the monitoring unit, whereby said sensors comprise means for generating data with respect to a position of a machine part movement and said monitoring unit comprises means, which with respect to the result of the comparison is arranged to stop a machine movement if conditions for a stop are fulfilled, wherein
said sensor is an absolute encoder, which in every position of movement of said part provides a position value to the monitoring unit through a common buss, which monitoring unit is arranged to process information about the position of said part and also said part's speed and direction and that said monitoring unit is arranged to compare values from said sensors and when detecting deviating value from either one of the sensors, to detect a functional error with the sensors.

2. The system according to claim 1,
wherein the monitoring unit is programmable.

3. The system according to claim 1,
wherein the
information about speed is used for stopping the machine if speed conditions are fulfilled.

4. The system according claim 1,
wherein the information about a direction of said machine part movement is used for stopping the machine if position conditions are fulfilled.

5. The system according to claim 1,
wherein said system is used for area limitation of an industrial robot.

6. The system according to claim 1,
wherein two or more sensors are inter-connected with one or several programmable programming units through a bus wire.

7. A robot monitoring system comprising a safety system for safety functions, which system prevents that an error in one control circuit does not result in a function failure by using supervising functions comprising at least two sensors connected to a monitoring unit, which receives and processes information about a position of a machine from both sensors and compares the results with stored values and a number of input conditions for the monitoring unit, whereby said sensors comprise means for generating data with respect to a position of a robot part's movement and said monitoring unit comprises means, which with respect to the result of the comparison is arranged to stop a parts movement if conditions for a stop are fulfilled, wherein the
sensor is an absolute encoder, which in every position of movement of said robot part provides a position value to the monitoring unit through a common buss, which monitoring unit is arranged to process information about the position of said robot part and also said part's speed and direction and that said monitoring unit is arranged to compare values from said sensors and when detecting deviating value from either one of the sensors, to detect a functional error with the sensors.

8. The system according to claim 7, wherein said system comprises means for storing instructions relating one or several of:

one or several protection sensors,
speed limit,
area limitation,
area limitation for both rectilinear and rotating movements, and
combinations of speed limit and area limitation.

* * * * *